United States Patent [19]

Maier et al.

[11] 4,295,323
[45] Oct. 20, 1981

[54] TOWED CROP HARVESTER

[75] Inventors: Martin Maier; Josef Pürrer, both of Gottmadingen; Ronald Clemens, Allensbach, all of Fed. Rep. of Germany

[73] Assignee: Klöckner-Humboldt-Deutz AG (Zweigniederlassung Fahr), Gottmadingen, Fed. Rep. of Germany

[21] Appl. No.: 135,080

[22] Filed: Mar. 28, 1980

[30] Foreign Application Priority Data

Mar. 30, 1979 [DE] Fed. Rep. of Germany ....... 2912715

[51] Int. Cl.$^3$ ............................................. A01D 75/28
[52] U.S. Cl. ..................................... 56/10.2; 180/79.1
[58] Field of Search ...................... 56/10.2, 14.9, 15.1, 56/15.2, 15.3, 15.4, 15.5; 180/131, 79.1; 280/419

[56] References Cited

U.S. PATENT DOCUMENTS

| 3,952,828 | 4/1976 | Stampfer et al. | 56/10.2 |
| 4,065,914 | 1/1978 | Phillips et al. | 56/15.5 |
| 4,077,488 | 3/1978 | Bennett et al. | 56/10.2 |

FOREIGN PATENT DOCUMENTS 526304 10/1976 U.S.S.R. ............................... 180/131

Primary Examiner—Robert A. Hafer
Attorney, Agent, or Firm—Karl F. Ross

[57] ABSTRACT

A towed harvesting machine, especially for row crop, has a chassis connected pivotally by a tow bar to a tractor and a fluid-responsive motor connected between the tow bar and the chassis or frame which is capable of laterally shifting the frame or chassis, and hence the mouth of the machine for ensuring alignment of the row crop with the mouth. The mouth of the machine can be provided with sensors controlling this motor, which can be a hydraulic cylinder, to assure this alignment.

3 Claims, 2 Drawing Figures

TOWED CROP HARVESTER

FIELD OF THE INVENTION

Our present invention relates to a crop harvesting and, more particularly, to a drawn or towed crop harvester which is provided with a tow bar between its frame or chassis and the tractor. The invention especially relates to a system for keeping the mouth of the machine aligned with a row or swath of materials to be harvested.

BACKGROUND OF THE INVENTION

Field choppers, row-crop harvesters and like machines for recovering forage crops, corn and silage-making crops from a planted site can be of the self-propelled, drawn (towed) or tractor-mounted type.

In the first case, the vehicle chassis or frame not only carries the mouth of the machine together with any cutting devices which may be required and/or any crop pickup elements for retrieving a previously cut crop, but also includes a prime mover, especially an internal combustion engine, which provides motive power for the wheels of the machine as well as for the mechanisms cutting or lifting the crop, transporting the crop rearwardly and/or laterally, chopping the crop if desired, and ejecting the crop, e.g. into a forage wagon which can be drawn behind the harvesting machine.

When drawn or towed harvesting machines are used, however, they generally are pulled from the drawbar of a tractor by a tow bar which is pivotally connected to a drawbar by a pin and which also may be pivotally connected to the chassis or frame on which the wheels of the machine are mounted. Such machines are generally of two types, namely, with or without a prime mover.

In the first type, a prime mover is provided upon the frame or chassis and drives the cutter and/or crop pickup, any crop conveying chains, belts, drums or screws, a chopper or crusher if desired, and the blower. Again the silage wagon can be attached behind or alongside the drawn machine.

When, however, a prime mover is not provided upon the chassis or frame, the mechanism carried by the latter is generally driven from the power takeoff shaft of the tractor, e.g. by a connecting shaft having a pair of universal joints and which may be extensible, telescoping or splined, to allow a variable distance to be maintained between the harvesting machine and the tractor.

With towed or drawn machines, it is frequently necessary to establish a predetermined relationship between the axis or center of the harvesting machine and the axis or center of the towing tractor for various reasons. For example, for road transport of the harvesting machine it is desirable that the harvesting machine be disposed directly behind the tractor. This configuration is a disadvantage in most types of crop harvesting, since the tractor should travel over the region of a previous swath or over previously harvested ground while the machine is disposed laterally thereof to encounter the standing or previously mown crop. In this latter state, the center of the machine can be significantly offset from the center of the tractor.

Mention should also be made of the fact that it is known, in self-propelled machines particularly, to provide means for automatically aligning the mouth of the machine with the crop material to be harvested. For example, harvesting machines have been provided heretofore with means for sensing the crop and adjusting the mouth laterally of the direction of travel.

It is also known to use chopper harvesters carried by an agricultural tractor. Steering corrections by the driver of the tractor then act directly upon the forage harvester. The correction of lateral deviations and driving along the row to be harvested are thus relatively easy.

However in this case there are limits to the size of the harvesting machine used. Automatic lateral guidance is not provided.

Mention can also be made of a system described in German Democratic Republic Pat. DD-PS 32 123 to secure a tool carrier, which is laterally displaceable by a hydraulic cylinder, on the three-point hitch of an agricultural tractor.

Laterally of the tractor a forwardly extending feeler is secured on the tool carrier. This feeler slides along plant rows and is pivoted mechanically in the case of deviations. Thus a voltage divider mounted on the same spindle is displaced. This divider is connected with a second voltage divider to form a bridge. The center taps of both are connected with an amplifier which amplifies the differences between the bridge values and transmits them to the electromagnets of the hydraulic control slide member of a multi-way valve. Thus the inflow and outflow of pressure medium in the bilaterally charged (double acting) hydraulic cylinder is regulated.

This system is likewise used only in implements carried by the tractor. Moreover in the case of a forage chopper harvester it is hardly suitable since by reason of its size and weight such a harvester can only be laterally shifted on a tool carrier with difficulty.

OBJECTS OF THE INVENTION

It is the principal object of the present invention to provide an improved crop harvesting machine of the drawn or towed type whereby the disadvantages enumerated above can be avoided.

Another object of this invention is to provide a drawn crop harvester in which the position of the mouth of the machine can be adjusted simply, rapidly and precisely relative to the towing tractor of a row or swath crop being harvested.

Yet another object of this invention is to provide a reliable automatic control system for positioning the mouth of a crop harvesting machine.

SUMMARY OF THE INVENTION

These objects and others which will become apparent hereinafter are attained, in accordance with the present invention, in a harvesting machine comprising a chassis which can be connected to a tractor by a tow bar which is pivoted on the chassis and can, if desired, be locked in a particular angular position relative to the chassis, e.g. for road travel.

According to the invention, a double-acting cylinder is pivotally connected to the tow bar and to the chassis at locations spaced from the tow bar pivot while the chassis is provided with at least one crop sensor which monitors the position of the row harvested and controls this cylinder to align the mouth of the harvesting mechanism on the chassis with the crop row by swinging the tow bar about its pivot relative to the chassis.

According to a feature of the invention, the cylinder is connected to a hydraulic pump through a multiposition valve controlled by a valve solenoid or actuator which is connected to a source of electric current through a switch forming part or operated by the sensor which can be one of a pair of lateral guide feelers for the row to be harvested. Preferably both feelers are electric switches and we have found to be advantageous to use in addition a manual switch having change-over contacts in series with the switches of the guide feelers and at least one fixed contact to which the valve solenoid is connected. A movable contact of the manual switch can be connected to the electric current supply lead or terminal.

According to another feature of the invention, an automatic switch having a detent for retaining it in a set position is formed as an interrupter in the connection between the lateral guide feelers and the manual switch.

We have also found it to be advantageous to provide means in the form of a specific orientation of the contacts of the feelers, for preventing disruption of the control system when a stalk is out of place and tends to operate both switches simultaneously. This arrangement can include double pole switches for each of the feelers, with each of the feeler switches having one normally open contact and one normally closed contact in the raised position.

It is seen that here for the first time the pivotal position of the pivoting bar of a drawn harvesting machine is influenced by means of a hydraulic cylinder. The pivotal position is itself again automatically determined in accordance with the control commands of at least one lateral guide feeler. Since the pivotal position of the pivoting pole has a direct influence upon the following properties of the drawn harvesting machine behind the tractor, reliable guidance along the row to be harvested is achieved without the need for special skill or attention by the driver of the tractor for this purpose. The result is a considerable facilitation of work.

The formation of the lateral guide feelers as mechanically actuated electric switches is especially expedient. In this case an automatic switch with detent-fitted automatic switch position is advantageously connected in series with the lateral guide feeler and moreover a manual switch formed as change-over switch is connected between the automatic switch and the current source. The manual switch has additional contacts for direct actuation of the hydraulic cylinder, bypassing the lateral guide feelers. Thus a considerable simplification of operation is achieved.

Starting from the rest position it is possible by closure of the automatic switch to initiate the automatic function. Nevertheless this automatic function can be overridden at any time by hand, since on actuation the manual switch, starting from its detent-determined rest position, disconnects the automatic switch from the current source and instead renders possible direct intervention for actuation of the supply of the hydraulic cylinder through multi-way valve and electro-magnetic valve solenoid. In situations which do not permit ordinary function of the automatic lateral guide by reason of the deflections of the lateral guide feeler, and in all emergency cases thus rapid intervention in the controls is possible despite the otherwise exploited advantages of automatic lateral guidance.

If two lateral guide feelers are arranged one on each side of the row of stalked plants, these are preferably formed as double switches as, each of which comprises an opener contact closed in the rest position and opening when the feeler is deflected and a closer contact which is open in the rest position and closes when the feeler is deflected.

If the movable contacts of the opener contacts are connected with one another and possibly with the feed conductor, the fixed contacts of the one opener contact are connected each with the fixed contact of the closer contact of the other lateral guide feeler and finally the movable contacts of the closer contacts are connected with the control terminals of the valve switch of the multi-way valve, then an occasionally occurring simultaneous deflection of both lateral guide feelers can involve no disadvantages.

This can occur if for example a corn stalk is growing laterally beside the actual row. Since now due to the double switch, when one lateral guide feeler responds in each case in the automatic control system the other lateral guide feeler or its switch is de-energized, defective double actuation of the automatic lateral guidance cannot occur.

The automatic pivotal controlling of the pivoting bar and the automatic lateral guidance of the drawn harvesting machine caused by this are thus capable of functioning and trouble-free under all circumstances and facilitate the guidance of the drawn harvesting machine along one or more rows to be harvested, without special attention and effort.

SPECIFIC DESCRIPTION

Figure 1:
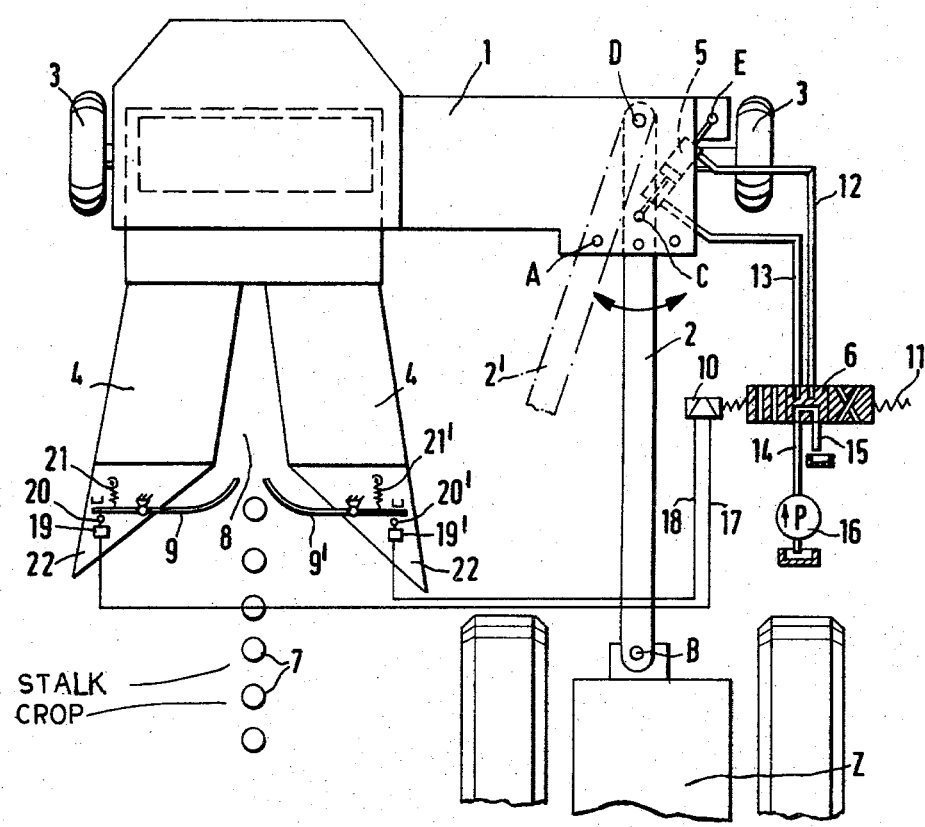
FIG. 1 is a diagrammatic plan view of a chopper-type forage harvester equipped in accordance with the invention and drawn by a tractor.

FIG. 1 shows diagrammatically a harvesting machine for harvesting stalk crops, such as corn. In the present case it is a forage chopper harvester. A housing 1 is fixedly assembled on a chassis. It is further provided with a pivoting tow bar 2, road wheels 3 and a front attachment 4, here a corn picking attachment.

Different articulation points, designated by capital letters, are allocated to the tow bar 2. The front end of the pivoting tow bar 2 is connected detachably with the articulation point B in the drawbar of an agricultural tractor Z.

The rearward end of the towbar 2, in relation to the direction of travel, is pivotally made fast at the articulation point D on the housing 1 or the chassis. A double arrow above the pivoting tow bar 2, indicates the possibilities of movement of this pivoting member.

Peg holes are provided along an arc around the articulation point D on the housing 1 at a distance from the articulation point D. The tow bar 2 itself likewise has a peg hole which is at the same distance from the articulation point D. Thus the pivoting tow bar 2 can also be fixed by a peg in a specific pivotal position. If, by way of example, the peg is used to fix the pivoting pole at the locking point A, then the bar assumes the position 2', entered in dot-dash lines, for road transport. In this position the drawn chopper forage harvester runs largely behind the tractor Z and by reason of the oblique course has a reduced trailer width.

One end of a hydraulic cylinder 5 is now articulated to the housing 1 at an articulation point E laterally of the rear end of the pivoting tow bar 2 or, in relation to the direction of travel, laterally, of the articulation point D. The other end of the hydraulic cylinder 5, for example its piston rod, is secured to an articulation point C of the tow bar 2 at a distance from its own articulation point D. As long as the tow bar is not locked with the housing 1, thus its pivotal position can be regulated in the direction of the double arrow by means of the hydraulic cylinder 5 in relation to the housing 1 of the chopper forage harvester. Thus a kind of caster steering or lateral control takes place with the aid of which the chopper forage harvester can be guided along the maize row or a plurality of maize rows.

For automatic lateral guidance for this purpose the hydraulic cylinder 5 is actuated through a multi-way valve 6 in such manner that the chopper forage harvester is guided along a row of maize stalks 7 so that the corn stalks of the row 7 each enter the intake gap 8 of the front attachment 4 in the centered manner, which gap like the row itself lies in the direction of travel. For this purpose the multi-way valve 6 is actuated under the influence of lateral guide feelers 9, 9', one of which is arranged on each side of the row 7.

The multi-way valve 6 is actuated by the lateral guide feelers 9, 9' through a valve solenoid 10 which displaces the valve body against the action of a compression spring 11. The ¾-way (three-position, four-port) valve 6 is connected with the hydraulic cylinder 5 through hydraulic conduits 12, 13 which open in the hydraulic cylinder at the two ends, on the two sides of the piston moving in the hydraulic cylinder 5. Through the multi-way valve 6 the hydraulic leads 12, 13 are connectable with a pressure conduit 14 and a pressure-medium discharge conduit 15. The pressure conduit 14 is connected to a hydraulic pump 16, the pressure-medium discharge conduit 15 is connected to the pressure medium tank. The multi-way valve 6 has the functions indicated and is shown in a position in which the pivotal position of the pivoting tow bar 2 existing at the time is being maintained.

The valve solenoid 10 is actuated by the lateral guide feelers 9, 9' through electric leads 17, 18. For this purpose in each case a sensitive switch 19, 19' with switch sensor 20, 20' is provided. The lateral guidance feelers 9, 9' are drawn each under the action of a tension spring 21, 21' on to a stop in the divider tip 22, where the respective lateral guidance feeler 9, 9' is articulated. The arrangement can be seen clearly from FIG. 1.

If a lateral guidance feeler is deflected, on coming too close to the row 7 of stalk plants, by these plants against the action of the tension spring, then it actuates the associated switch sensor and through the latter the sensitive switch, which lies in the feed voltage circuit for the associated feeding of the valve solenoid 10.

If by way of example the lateral guidance feeler 9 comes into contact with the row 7, the valve solenoid 10 is actuated through the electric lead 17 and displaces the multi-way valve 6 to the right. Thus pressure medium is fed through the hydraulic conduit 13 to the hydraulic cylinder 5 and the pressure-medium present in the hydraulic cylinder 5 on the other side of the piston is discharged through the hydraulic conduit 12 to the tank. The pivoting tow bar pivots in the anticlockwise direction and thus corrects the position of the chopper forage harvester in relation to the row 7 until the lateral guidance feeler 9 comes out of contact with the corn stalks and the multi-way valve 6 returns into the rest position as shown in FIG. 1, the position of the pivoting tow bar being retained. The influencing of the pivoting tow bar by the lateral guidance feeler 9' takes place in the corresponding manner.

Thus without particular demands of the attention of the driver the drawn harvesting machine is constantly kept in line in an effective and nevertheless entirely simple manner.

Figure 2:
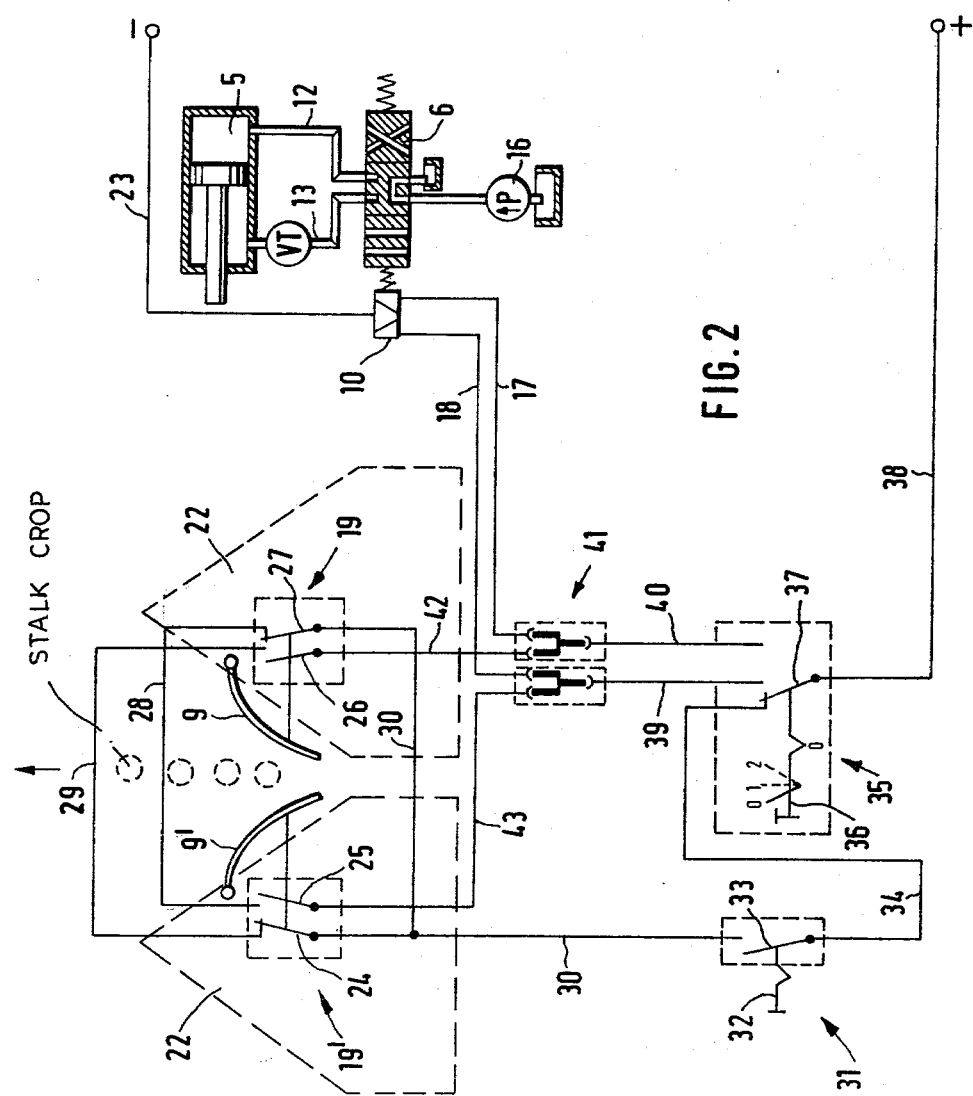
FIG. 2 is a diagram of the automatic pivoting bar displacement mechanism.

FIG. 2 shows the manner of the actuation of the valve solenoid 10 through the lateral guidance feelers 9, 9' in the divider tips 22 in greater detail.

The magnet coil of the valve solenoid 10 is grounded in the usual manner with a terminal through the lead 23. If potential is applied to the magnet coil either through the electric lead 17 or through the electric lead 18 the valve switch acts in the direction of charging and displacement of the multi-way valve 6 from the rest position as shown in FIG. 2 in the one or the other direction.

The sensitive switches 19, 19' actuated by the lateral guidance feelers 9, 9' now in the manner as shown in FIG. 2 each have two contact pairs, namely an opener contact 24, 27 and a closer contact 25, 26.

The opener contact 27 of the sensitive switch 19 is here connected through a lead 28 with the closer contact 25 of the sensitive switch 19' while the opener contact 24 of the sensitive switch 19' is connected through a lead 29 with the closer contact 26 of the micro-switch 19.

If one of the lateral guidance feelers 9, 9' comes into contact with the corn stalks indicated in FIG. 2, then its deflection in each case opens the opener contact 24, 27 and closes the closer contact 25, 26. In the rest position, that is when the lateral guide feelers are not deflected, on the other hand the opener contacts 24, 27 are closed and the closer contacts 25, 26 are open, as shown in this FIG.

The opener contact 27 of the sensitive switch 19 is further short-circuited with the opener contact 24 of the micro-switch 19' and connected through an electric lead 30 with an automatic switch 31. This comprises a detent-fitted actuator 32 and an interrupter switch 33. If the detent-fitted actuator is pressed in, the interrupter switch 33 is closed and connects the electric lead 30 with a manual switch 35, through a connecting lead. The switch 35 has a manual actuator 36 for a change-over switch 37. When the manual actuator 36 is in the detained zero position the change-over switch 37 connects the connection lead 34 through a supply lead 38 with the plus pole of the current supply. The manual actuator 36 can however also be brought into keyed switch positions "1" and "2" in which the supply lead 38 is connected with a lead 39 and a lead 40 respectively, through the change-over switch 37 or its movable switch contact.

When the manual switch 35 is in its zero position, the automatic function of the lateral guidance system can be selected by actuation of the automatic switch 31. This is a consequence of the fact that in relation to the supply lead 38 the change-over switch 37 and the interrupter switch 33 are connected in series. From this initial position, but of course also with the interrupter switch 33 opened, furthermore the pivoting tow bar 2 can be actuated by hand also, by means of the manual switch 35.

For this purpose the leads 39, 40 are connected in a distributor 41 directly with the electric leads 17 and 18 respectively to the valve solenoid 10. When the manual switch 36 is in the position "1" thus the valve solenoid 10 is connected through the lead 18 and the lead 39 to the supply lead 38. When the manual actuator is in the position "2" on the other hand the lead 17 is connected with the supply lead 38 through the lead 40.

On the other hand in automatic operation the connection of the leads 17, 18 to the valve switch 10 with the supply lead 38 takes place through leads 42, 43 likewise entering the distributor 41. Of these the lead 42, connected with the lead 17, is attached to the closing contact 26 of the sensitive switch 19, the lead 43 connected with the lead 18 is attached to the closing contact of the sensitive switch 19'.

The circuit arrangement works as follows:

Let it be assumed that the multi-way valve 6 is in the position as shown in FIG. 2. The manual switch 35 and the changeover switch 37 are likewise in the position as shown in FIG. 2, the interrupter switch 33 in the automatic switch 31 is assumed to be closed.

If the sensitive switches 19, 19' are situated in the positions as shown in FIG. 2, because no deflection of the lateral guide feelers 9, 9' by corn stalks takes place, then by reason of the connection of the supply conduit 39 through the connection lead 34, lead 30 and the leads 28 and 29 the potential is present in each case on the upper contact of the closer contacts 25, 26, but does not pass to the leads 42, 43 and thus also not to the valve solenoid 10. Thus the multi-way valve remains in its rest position as shown in FIG. 2.

If now the feeler element 9 is subject to action by a corn stalk, the closer contact 25 closes and the opener contact 27 opens. Now the supply conduit 38 is connected through the closer contact 26 with the lead 42 and through the distributor 41 with the lead 27 to the valve switch 10 which influences the multi-way valve 6 in the direction of a correction of the direction of running, through the hydraulic cylinder 5 and the pivotal position of the pivoting pole 2. At the same time due to the opening of the opener contact 27 the connection of the upper contact of the closer contact 25 with the supply lead 38 through the lead 28 is eliminated.

In this way the possibility is prevented that in the case of simultaneous actuation of the lateral guide feeler 9' by a corn plant standing outside the row 7, a simultaneous actuation may take place in the direction of a correction in the opposite direction too. Thus the double formation of the switches ensures a reliable function of the automatic lateral guide system.

The correction command on the hydraulic cylinder 5 is maintained until the feeler 9 again comes out of contact with the row 7 of stalked plants, thus the desired correction target is reached. The automatic lateral guidance system returns into the above-explained initial position. The multi-way valve 6 also returns into its rest position. The hydraulic cylinder is locked hydraulically by means of a non-return valve (not shown).

If by chance both lateral guide feelers 9, 9' should be actuated out of this rest position at the same time, incorrect behavior of the automatic lateral guide system is not possible, because by this actuation the contacts of the closer contacts 25, 26 indicated in each case above in the Figure are simultaneously de-energized through the opener contacts 24, 27, so that in this case no control commands pass to the valve solenoid 10.

We claim:

1. A harvesting machine comprising:
a chassis adapted to be drawn along the ground;
a harvesting mechanism on said chassis having a crop engaging mouth and adapted to harvest stalk crop guided into said mouth upon the movement of the chassis along the ground along a row of crop to be harvested;
a tow bar pivotally connected to said chassis and adapted to be attached to a tractor to enable the chassis to be towed thereby;
a hydraulic cylinder pivotally connected to said chassis and to said tow bar at respective locations spaced from the pivot between said tow bar and said chassis whereby hydraulic pressurization of said cylinder varies the angular orientation of said tow bar and said chassis about said pivot;
two lateral guide feelers swingable on said chassis on opposite sides of said mouth responsive to the said position of said row; and
control means connected between said feeler and said cylinder for pressurizing said cylinder in response to said feeler to align said mouth with said row, said control means including
a hydraulic pump,
a multiposition valve connected between said pump and said cylinder and having a valve-actuating solenoid,
respective double-pole switches operatively connected with said feelers and actuated thereby each of said switches including a normally closed fixed contact opened by the pivoting of the respective feeler upon engagement with a stalk of said crop and a normally open fixed contact closed by said pivoting of the respective feeler and respective movable contacts assigned to said fixed contacts and connected to the respective feeler,
first circuit means electrically connecting the normally closed fixed contact of one of said switches to the normally open fixed contact of the other switch and the normally open fixed contact of said one of said switches to the normally closed fixed contact of said other switch,
second circuit means connecting the movable contacts associated with said normally closed switches together and to an electric current source, and
third circuit means connecting the movable contacts associated with said normally open switches to terminals of said solenoid.

2. The machine defined in claim 1, further comprising means for locking said tow bar to said chassis at a selected angular orientation thereof for road transport.

3. The machine defined in claim 1, further comprising a manual switch formed as a change-over switch and connected in series with other switches of said feelers, said manual switch having a further contact connected to said solenoid and a movable contact connected to said source, and an automatic switch provided as a detent and forming an interrupter connected between said manual switch and the switches of said feelers.

* * * * *